(12) United States Patent
Ziegler

(10) Patent No.: US 6,718,395 B1
(45) Date of Patent: Apr. 6, 2004

(54) APPARATUS AND METHOD USING AN INQUIRY RESPONSE FOR SYNCHRONIZING TO A COMMUNICATION NETWORK

(75) Inventor: Kevin Ziegler, Campbell, CA (US)

(73) Assignee: Computer Access Technology Corporation, Santa Clara, CA (US)

( * ) Notice: Subject to any disclaimer, the term of this patent is extended or adjusted under 35 U.S.C. 154(b) by 613 days.

(21) Appl. No.: 09/686,146

(22) Filed: Oct. 10, 2000

(51) Int. Cl.[7] .............................................. G06F 15/16
(52) U.S. Cl. ...................... 709/248; 375/356; 370/350; 370/503; 709/223; 709/224
(58) Field of Search ................................ 709/208, 237, 709/248, 223, 224; 370/350, 503; 375/356

(56) References Cited

U.S. PATENT DOCUMENTS

| | | | |
|---|---|---|---|
| 6,590,928 B1 * | 7/2003 | Haartsen ..................... | 375/134 |
| 6,603,799 B1 * | 8/2003 | Hlasny ....................... | 375/132 |
| 6,639,905 B1 * | 10/2003 | Muller et al. .............. | 370/336 |
| 2001/0056501 A1 * | 12/2001 | Law et al. .................. | 709/248 |

OTHER PUBLICATIONS

Bluetooth Specification Version 1.0 B, dated Dec. 1, 1999.*
Gaidioz et al., "Synchronizing Network Probes to Avoid Measurement Intrusiveness with the Network Weather Service," Aug. 2000, Ninth International Symposium on High-—Performance Distributed Computing, 2000, pp. 147–154.*

You et al., "Performance of Simple Timing Synchronization and DC–offset Compensation Schemes for a Short–Range Bluetoot Network," Sep. 2000, 11th IEEE International Symposium on Personal, Indoor and Mobile Radio Communications, vol. 2, pp. 1320–1324.*

You et al., "Adaptive Timing Synchronization Schemes for a Short–Ranged Bluetooth System," Aug. 2000, IEEE Transactions o Consumer Electronics, vol. 46, issue 3, pp. 690–696.*

* cited by examiner

Primary Examiner—Glenton B. Burgess
Assistant Examiner—Bradley Edelman
(74) Attorney, Agent, or Firm—David R. Gildea

(57) ABSTRACT

A method and apparatus for synchronizing with communication traffic in a BLUETOOTH network without joining the network. The apparatus transmits an inquiry signal and receives an inquiry response signal having a coarse system clock time. The apparatus uses the coarse system clock time for estimating an initial channel in a channel hopping sequence then advances channels through the sequence in steps of four or more for scan window time periods of four or more time slot periods until a communication traffic signal is recognized. The time-of-arrival of the traffic signal is used for refining the coarse system clock time in order to acquire the exact system clock time. The exact system clock time is used by the analyzer for deriving the channels and timing of the sequence for synchronizing to subsequent communication traffic signals.

24 Claims, 8 Drawing Sheets

| Master TX | Slave TX | Master TX | Slave TX | Master TX | Slave TX | Master TX | Slave TX |
|---|---|---|---|---|---|---|---|
| 79 | 03 | 06 | 47 | 18 | 02 | 17 | 61 |

| ALLOWANCE FOR CLOCK DRIFT IN us | CHANNEL ADVANCE NUMBER | SEQUENCE OF MASTER CHANNELS | TIME SLOT SCAN NUMBER | SCAN WINDOW TIME PERIOD IN TIME SLOTS |
|---|---|---|---|---|
| 312.5 | 4 | M2,M4,M6,M8... | 4 | 4 |
| 1562.5 | 8 | M4,M8,M12,M16... | 8 | 8 |
| 4062.5 | 16 | M8,M16,M24,M32... | 16 | 16 |
| 9062.5 | 32 | M16,M32,M48,M64... | 32 | 32 |

Fig. 7

APPARATUS AND METHOD USING AN INQUIRY RESPONSE FOR SYNCHRONIZING TO A COMMUNICATION NETWORK

BACKGROUND OF THE INVENTION

1. Field of the Invention

The invention relates generally to network synchronization and more particularly to a method and apparatus using an inquiry response and a subsequent instance of communication traffic for synchronizing with a communication network without joining the network.

2. Description of the Prior Art

Many system standards have been developed for communication. One such system standard is known as BLUETOOTH. BLUETOOTH is a short range radio system operating in the unlicensed 2.4 GHz Industrial Scientific Medical (ISM) band using frequency hopping spread spectrum signals. The spread spectrum signals enable the system to minimize fading and reduce interference between users. The BLUETOOTH spread spectrum is designed to meet parts 15 and 18 of the Federal Communications Commission (FCC) regulations in the United States and the regulations of other regulatory agencies in other countries. The BLUETOOTH signal uses seventy-nine or twenty-three frequency hopping channels depending upon the country of operation. At any one instant of time, the signal is transmitted in a single one of the channels. Each channel has a bandwidth of one megahertz. The channels succeed each other in a pseudo-random channel hopping sequence specified by a BLUETOOTH system standard. Each successive frequency channel corresponds to a phase or time slot of the pseudo-random sequence.

A BLUETOOTH system network known as a piconet includes a single master device and up to seven active slave devices. The network topology is referred to as a star because all communication involves the master device. Slave to slave communication is not allowed. Another BLUETOOTH network, known as a private network, uses only a single master device and a single active slave device. Typically, the private master and slave devices work with a limited subset of the BLUETOOTH protocol and are provided by a manufacturer as a set.

FIG. 1A shows a time line of communication traffic exchange in a BLUETOOTH network. Packets of information are exchanged between the master device and a selected slave device using time division duplex (TDD) with alternating master (master TX) and slave (slave TX) transmissions. Communication traffic is partitioned into time slots 625 microseconds in length for each frequency channel. Every other time slot is considered to be a master time slot. In the master time slot, the master device can transmit a master data packet addressed to a particular slave device. In the following time slot, the addressed slave device may respond to the master data packet by transmitting a slave data packet back to the master device. Transmissions in successive time slots occur on sequential frequency channels in a pseudo-random sequence shown in FIG. 1A in an exemplary manner as channels 79, 03, 06, 47, 18, 02, 17, and 61. The frequency channels are mapped to specific ISM band frequencies by adding a constant offset frequency that is specific to a region. In the United States and most of Europe the offset is 2402 megahertz.

FIG. 1B shows a simplified block diagram for a BLUETOOTH device having a hop sequence generator. Both the master and the slave devices compute the successive channels from a BLUETOOTH system clock time maintained in the master device and the address identification of the master device. In order to follow the frequency hopping sequence of a particular piconet, a slave device must know both the master address and the precise system clock time. The hop sequence generators in the master and slave devices compute the frequency channels for the communication traffic from 24 bits of a 48-bit IEEE address of the master device and a 28-bit system clock time. In addition the timing of the frequency hops is based upon the system clock time. The master clock is a free running counter that increments each 312.5 microseconds (3200 Hz) or one-half of a time slot. Packet data sent in a BLUETOOTH format is scrambled through a linear feedback shift register based on the BLUETOOTH clock to reduce DC bias and improve security of the information in the data packets.

Several modes are described in the BLUETOOTH system specification. The communication traffic mode is the normal operational mode for communication between the master and slave devices that are joined or connected in the network. Modes for inquiry, inquiry scan, and inquiry response are used in a who-is-there protocol for identifying BLUETOOTH devices that are within signal range. In the inquiry mode an inquiry is broadcast on frequency hopping channels of an inquiry sequence. A recipient BLUETOOTH device is induced by the inquiry to respond with an inquiry response having the address of the recipient device and the recipient device clock time on frequency hopping channels based upon the frequency channel of the inquiry. Inquiry scan is a mode for listening for an inquiry from a BLUETOOTH device on frequency hopping inquiry listen channels in an inquiry scan sequence.

Modes for page, page scan, page response, master page frequency hop synchronization (FHS), and slave page FHS response are used for synchronizing and connecting the devices. A page from a master device starts a paging handshake by transmitting an address identification of a device being paged on frequency hopping page transmit channels of a paging sequence. Page scan is a mode for listening on frequency hopping page listen channels of a page scan sequence for a page having the listener's address identification. Page response is a mode for responding to the page on page response channels based upon the page transmit channels. Master page FHS is a mode for responding to the page response by transmitting an FHS signal on the next frequency hopping channel in the paging sequence. Slave page FHS response is a mode for connecting to the network by responding to the master page FHS response.

FIG. 2A shows a time line of the operation of the master and slave devices during page and inquiry modes. In order to page a slave device, the master device alternately transmits (TX) pages on two successive frequency channels and then listens (LX) on two successive frequency channels for page responses. The page time period for each channel is 312.5 microseconds or one-half the normal time slot period of 625 microseconds. The slave device in page scan mode listens for the pages on successive page listen channels (LX scan k and LX scan k+1) of a page scan sequence with a time period of 1.28 seconds for each channel until a page is recognized.

FIG. 2B shows a time line of the paging sequence for the master device when the paged slave device responds to the page. The master device transmits (TX) pages in successive page transmit channels and listens (LX) for a page response in a paging sequence. When the page response is received, the master device responds by transmitting an FHS packet (TX FHS) containing both the address of the master device and the 26 most significant bits (MSB)s of the 28 bits of the system clock time on the next channel of the paging sequence. The slave device then resolves the 2 least significant bits (LSB)s of the master time clock from the time-of-arrival of the FHS packet. The slave device now has all the information it needs for determining the channels and timing of the frequency hopping sequence and participating in communication traffic. At this point, the slave device joins the network by responding to the FHS packet.

An inquiry is similar to a page in that an inquiring device transmits inquiries on successive frequency channels in an inquiry sequence and then listens on corresponding frequency channels for inquiry responses with time periods for each channel of 312.5 microseconds. A device in inquiry scan mode listens for the inquiries on successive channels of an inquiry scan sequence with a time period of 1.28 seconds for each channel until an inquiry is recognized. When the device in inquiry scan mode recognizes the inquiry it responds by transmitting an FHS packet having its address and the 26 MSB bits of the 28 bits of its own clock time. However, a major distinction between a page and an inquiry is that the time-of-transmission of the master page FHS packet for a page is based upon the system clock time whereas the time-of-transmission of the FHS packet for an inquiry is based upon the local clock time of the inquiring device. As a result of this distinction, existing BLUETOOTH devices use paging but not inquiry for determining the system clock time for synchronizing to the network. A second major distinction is that a page is always initiated by a master device whereas an inquiry may be initiated by any BLUETOOTH device having inquiry capability. A third major distinction is that the FHS packet for a page carries coarse system clock time whereas the FHS packet for an inquiry carries coarse clock time for whatever device responds to the inquiry.

A more complete description of the BLUETOOTH system is available in the specification volume 1, "Specification of the Bluetooth System—Core" v1.0 B published Dec. 1, 1999, and the specification volume 2, "Specification of the Bluetooth System—Profiles" v1.0 B published Dec. 1, 1999, both under document no. 1.C.47/1.0 B. The volume 1 core specification specifies the radio, baseband, link manager, service discovery protocol, transport layer, and interoperability with different communications protocols. The volume 2 profiles specification specifies the protocols and procedures required for different types of BLUETOOTH applications. Both volumes are available on-line at www-.bluetooth.com or through the offices of Telefonaktiebolaget LM Ericsson of Sweden, International Business Machines Corporation, Intel Corporation of the United States of America, Nokia Corporation of Finland, and Toshiba of Japan.

In order to synchronize to BLUETOOTH communication traffic packets for measurement and analysis purposes it would be relatively straightforward for an analyzer to use the paging process to join the piconet as a test slave device. However, this approach has several disadvantages. First, by joining the piconet the analyzer changes the piconet. A question can then arise as to whether the communication traffic pattern on the piconet was affected by the presence of the analyzer. Second, the analyzer would necessarily use one of the active slave positions in the piconet. Where all of the up seven slave positions were being used, the connection of the analyzer would prevent one of the slaves from being connected. This might be inconvenient and it would certainly change the network being tested. Worse still, in a private network having only a single master and single operational slave, the analyzer would replace either the master or the single active slave, thereby making it impossible to observe actual communication traffic between the master and the slave device.

In general, it is desirable that a protocol analyzer monitor message traffic for measurement and analysis on a link without joining or interfering with the operation of the link. With regard to a BLUETOOTH network, this means that a protocol analyzer should be able to follow all the traffic in a piconet without replacing the master or any of the operational slaves, or participating in the piconet in any way as either a master of a slave device. However, in order to monitor traffic on a BLUETOOTH link, a protocol analyzer needs to know the system clock time for the piconet. Unfortunately, the BLUETOOTH system protocol specification does not make any provision for acquiring this clock time except by joining and participating in the piconet. Therefore, there is a need for system that goes beyond the BLUETOOTH specification for non-intrusive test and measurement of a BLUETOOTH link.

SUMMARY OF THE INVENTION

It is therefore an object of the present invention to provide an apparatus and a method using an inquiry response and a subsequent instance of communication traffic for synchronizing to the communication traffic in a network without joining the network. This and other objects of the present invention will no doubt become obvious to those of ordinary skill in the art after having read the following summary and detailed description and viewing the figures illustrating the preferred embodiments.

Briefly, in a preferred embodiment, the present invention is a method and apparatus for synchronizing with a network connecting a master device and slave devices exchanging communication traffic packets during time slots on channels in a channel hopping sequence. The timing and sequence of the channels of the communication traffic are synchronized to a system clock time that is maintained by the master device. The apparatus synchronizes to the communication traffic by obtaining a coarse system clock time in a preliminary signal having an inquiry response packet from the master device and then refining the coarse system clock time with a time-of-arrival of a communication traffic packet from the master device.

An apparatus or analyzer of a preferred embodiment of the present invention transmits a who-is-there inquiry packet. When the master device is within signal range, it responds by transmitting an inquiry response packet having data bits having a coarse indication of the system clock time. The analyzer uses the coarse system clock time for estimating the timing and the current phase or channel of the channel hopping sequence and then advances the estimated current channel in the sequence by a selected initial channel advance number of channels to determine an initial channel. Beginning at the estimated initial channel, the analyzer steps or advances through the sequence by a selected subsequent channel advance number and monitors these channels for a selected scan window time period until a communication traffic packet from the master device is recognized. The time-of-arrival of the start of the packet is used for refining the system clock time for synchronizing to the channels and timing of the channel hopping sequence in order to observe the communication traffic.

The scan window time period is the time period of a normal time slot multiplied by a selected time slot scan number. The time slot scan number is selected in order to be large enough to allow for ambiguity in the coarse system clock time and clock time drift between the analyzer and the master device that can occur between the time when the analyzer receives the inquiry response and the time when the analyzer recognizes the communication traffic. There are two cases, a connected inquiry response and an unconnected inquiry response. In a connected inquiry response the master device can be expected to respond to the inquiry while maintaining connection to a slave device. In this case, a preferred time slot scan number is four. In an unconnected response, the master device cannot be expected to respond while maintaining connection. In this case a larger time slot scan number may be required in order to allow for clock time drift between the master device and the analyzer during the time between the receipt of the unconnected inquiry response and the receipt of an instance of connected communication traffic. In a preferred embodiment, the time slot scan number, the initial channel advance number, and the subsequent channel advance number are the same number.

Although the preferred embodiments illustrated in the figures and described in the accompanying detailed descriptions are described in terms of a BLUETOOTH system network, the present invention is applicable to other system networks using distinguishable channels in channel hopping sequences. The channels may be distinguished with frequencies, codes, time allocations, polarities, or any other distinguishing features alone or in combination.

BRIEF DESCRIPTION OF THE DRAWINGS

FIG. 7 is a table of channel advance and time slot scan numbers for the inquiry response synchronization method of FIG. 4.

DETAILED DESCRIPTION OF THE PREFERRED EMBODIMENTS

Figures 1A, 1B:
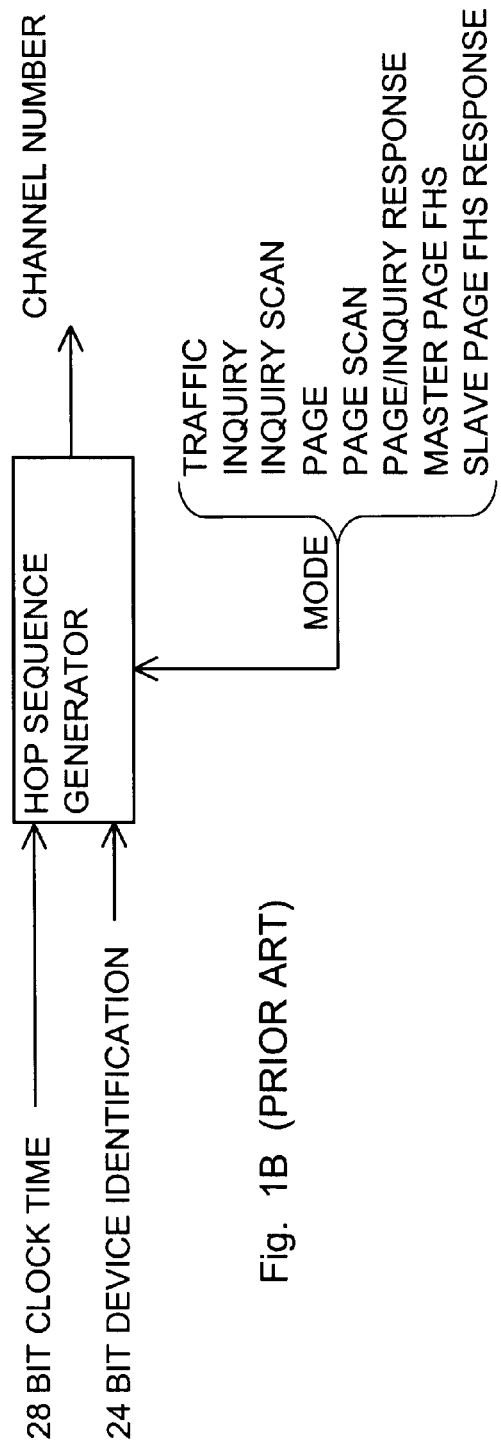
FIGS. 1A and 1B are a time line for communication traffic in a BLUETOOTH network of the prior art and a simplified block diagram of a BLUETOOTH device of the prior art, respectively.
Figure 2A:
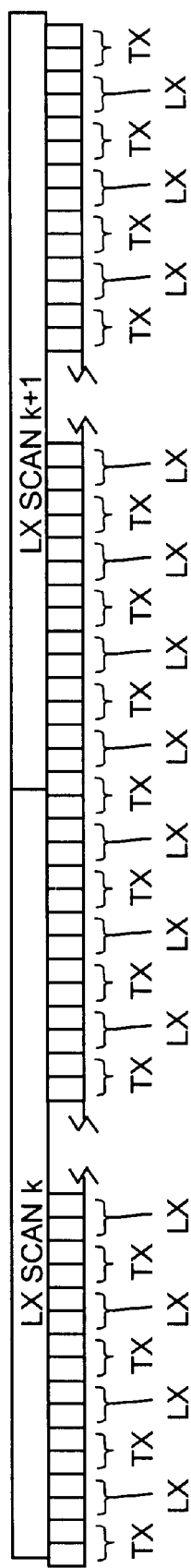
FIG. 2A is a time chart of page and page scan or inquiry and inquiry scan modes in a BLUETOOTH network of the prior art.
Figure 2B:
FIG. 2B is a time chart of page and page response communications in a BLUETOOTH master device of the prior art.
Figure 3:
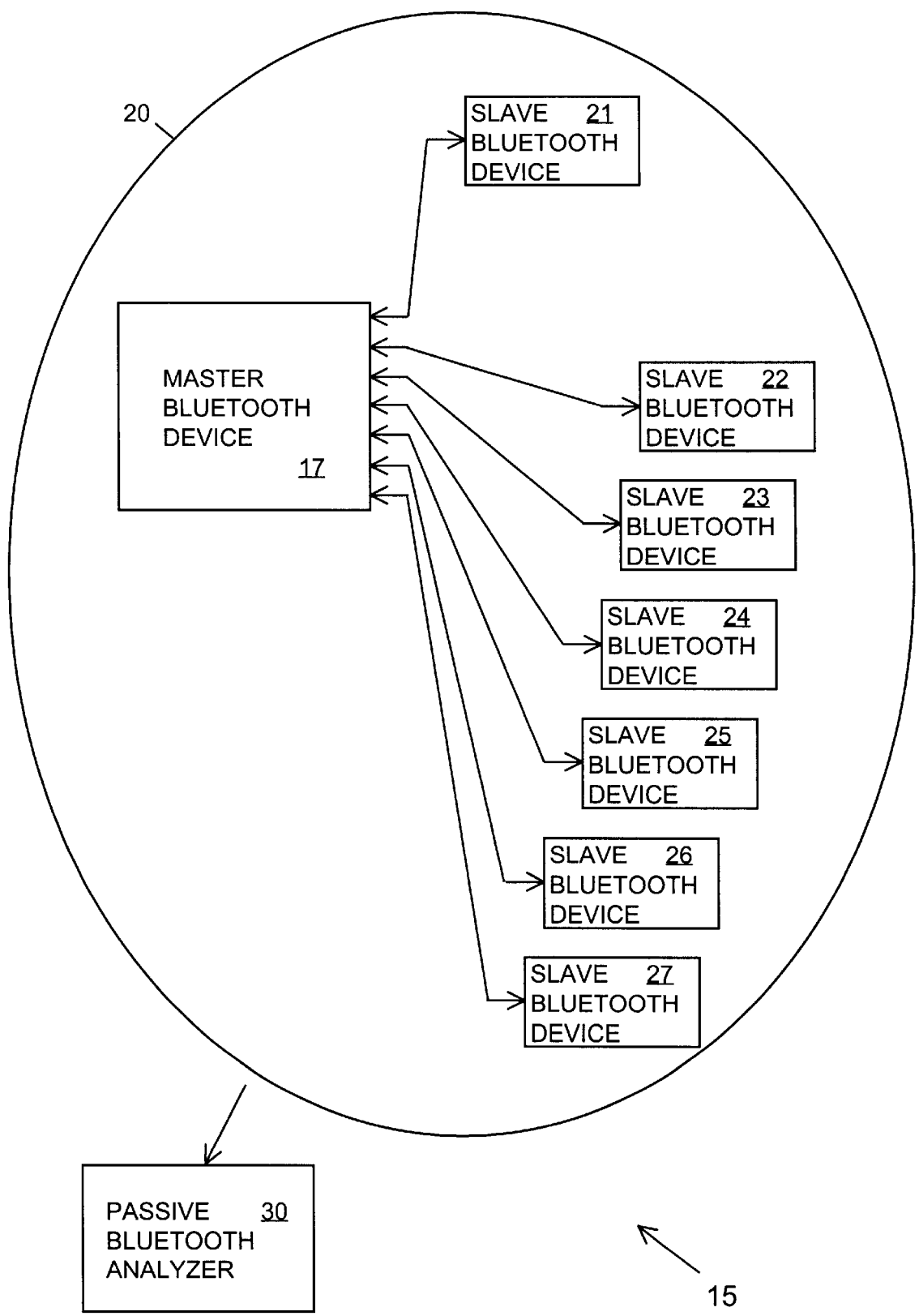
FIG. 3 is a block diagram of a system including a passive analyzer of the present invention.

FIG. 3 is a diagram of a system of the present invention referred to by the general reference number 15. The system 15 includes a BLUETOOTH master device 17 connected in a piconet network 20 to up to seven BLUETOOTH slave devices 21–27. The master device 17 and the slave devices 21–27 communicate during time slots on frequency channels in a channel hopping sequence as described above. An analyzer 30 of the present invention observes communication traffic signals between the master device 17 and the slave devices 21–27 in the network 20 but does not transmit communication traffic signals and the master device 17 and the slaves devices 21–27 are not aware that the analyzer 30 receives the communication traffic signals.

Figure 4:
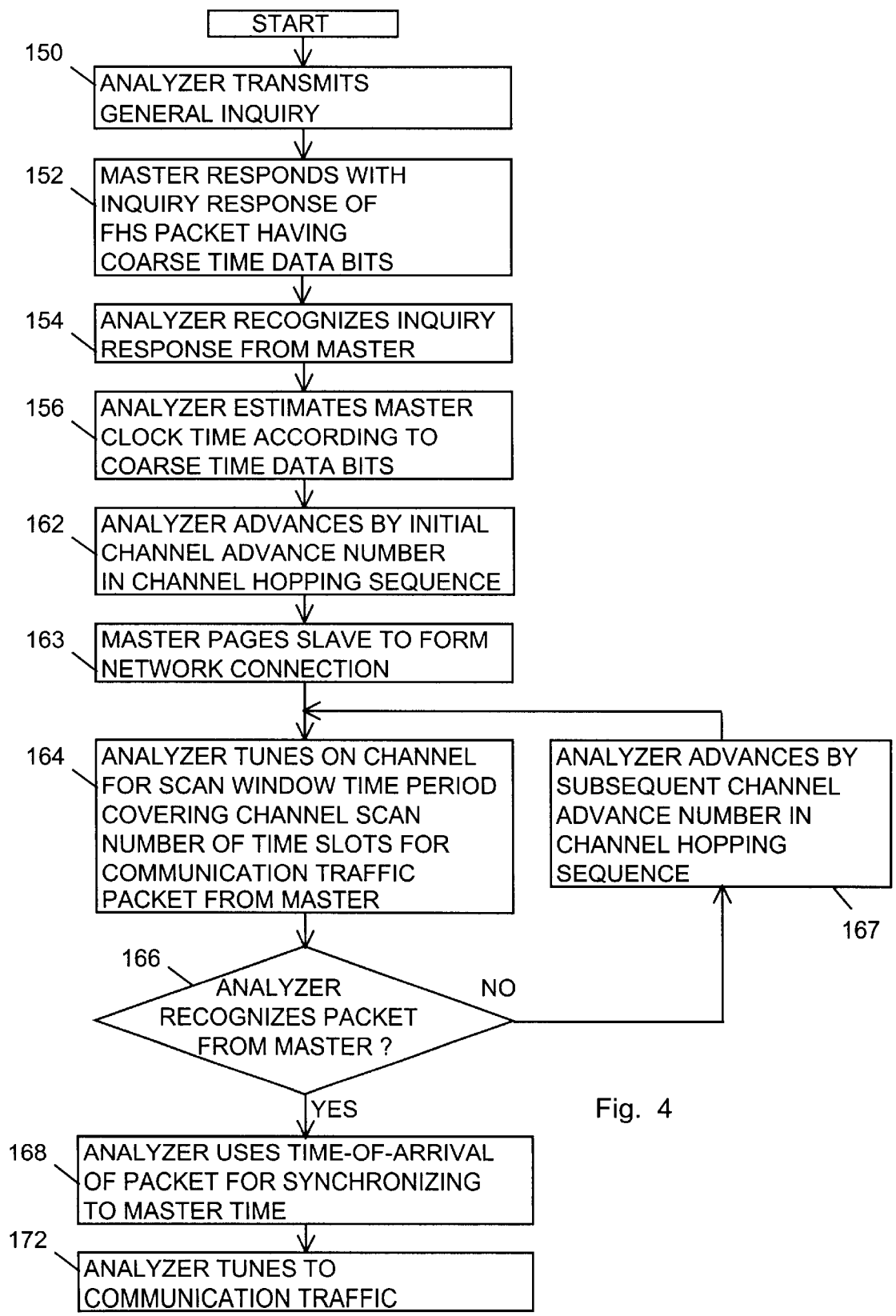
FIG. 4 is a flow chart of an inquiry response synchronization method of the present invention in the apparatus of FIG. 3 for synchronizing to a network having communication traffic on channels during time slots in a channel hopping sequence without joining the network.

FIG. 4 is a flow chart of an inquiry response based method for synchronization by the analyzer 30. The inquiry, inquiry scan, and inquiry response modes are described for the network 20 in the BLUETOOTH system specification. However, not all BLUETOOTH devices support all combinations of the features that are described. In particular, some implementations of master BLUETOOTH devices, for example some private master BLUETOOTH devices, do not support the inquiry response mode. Of BLUETOOTH master devices that do support the inquiry response mode some implementations of the master device 17 can respond to an inquiry while connected to the slave device 21–27 for communication traffic and some implementations can response to an inquiry but only when not connected. Before the start it is determined whether the master device 17 supports either a connected or an unconnected inquiry response. When the network 20 has already been established and the master device 17 supports connected inquiry response, it is preferable to proceed while the master device 17 and the slave devices 21–27 maintain connection. When the network 20 cannot be established or the master device 17 supports only unconnected inquiry response, the network 20 must be unconnected before proceeding.

At the start, a user enters information for the 48 bit IEEE address identification of the master device 17 into the analyzer 30. Then in a step 150 the analyzer 30 transmits a general inquiry. All the BLUETOOTH devices within signal range of the analyzer 30 that support inquiry response mode respond to a general inquiry with an inquiry response of a frequency hop synchronization (FHS) packet having information for their own 48 bit IEEE address and 26 most significant bits (MSB)s of their 28 bit clock time. In an event 152 the master device 17 is one of the BLUETOOTH devices that responds to the inquiry.

The master device 17 responds with an inquiry response of an FHS packet having address identification information for the master device 17 and the 26 MSB bits of the 28 bit system clock time. The 26 bits are termed the coarse time data bits. In a step 154 the analyzer 30 recognizes the master inquiry response from the master device 17. In a step 156 the analyzer 30 determines an estimated system clock time from the coarse time data bits in the FHS packet and uses a combination of the master address and the estimated system clock time for estimating a frequency channel corresponding to a phase in the pseudo-random channel hopping sequence of the BLUETOOTH system standard.

The analyzer 30 advances the estimated phase or channel of the sequence by a selected initial number, termed an initial channel advance number, of phases or channels in a step 162 to a new channel. As described below in the detailed description accompanying FIG. 5, a preferred initial channel advance number is four for a connected inquiry response based synchronization. For a scan number of four, the channel hopping sequence is advanced in the sequence by two master and two slave channels so that the first channel to which the analyzer tunes is the second one of the master transmission channels after the reception of the FHS packet by the analyzer 30. As described below in the detailed description accompanying FIG. 6, in the case of an unconnected inquiry response synchronization, a preferred initial channel advance number depends upon and increases with an allowance for clock time drift between a local clock time in the analyzer 30 and the system clock time in the master device 17. Typically, a worst case allowance is the length of time between the receipt of the inquiry response FHS packet and the receipt of an instance of communication traffic from the master device 17 multiplied by the sum of the clock rate errors of the local and master clocks.

For the case of an unconnected inquiry response, in a step 163 the user instructs the master device 17 to page at least one of the slave devices 21–27. The master device 17 and one of the slave devices 21–27 process the paging messages in a conventional manner for connecting and thereby forming the network 20. For the case of a connected inquiry response, the network 20 is already formed. When the network 20 is formed, the master device 17 and at least one of the slave devices 21–27 can begin exchanging communication traffic packets.

Figure 5:
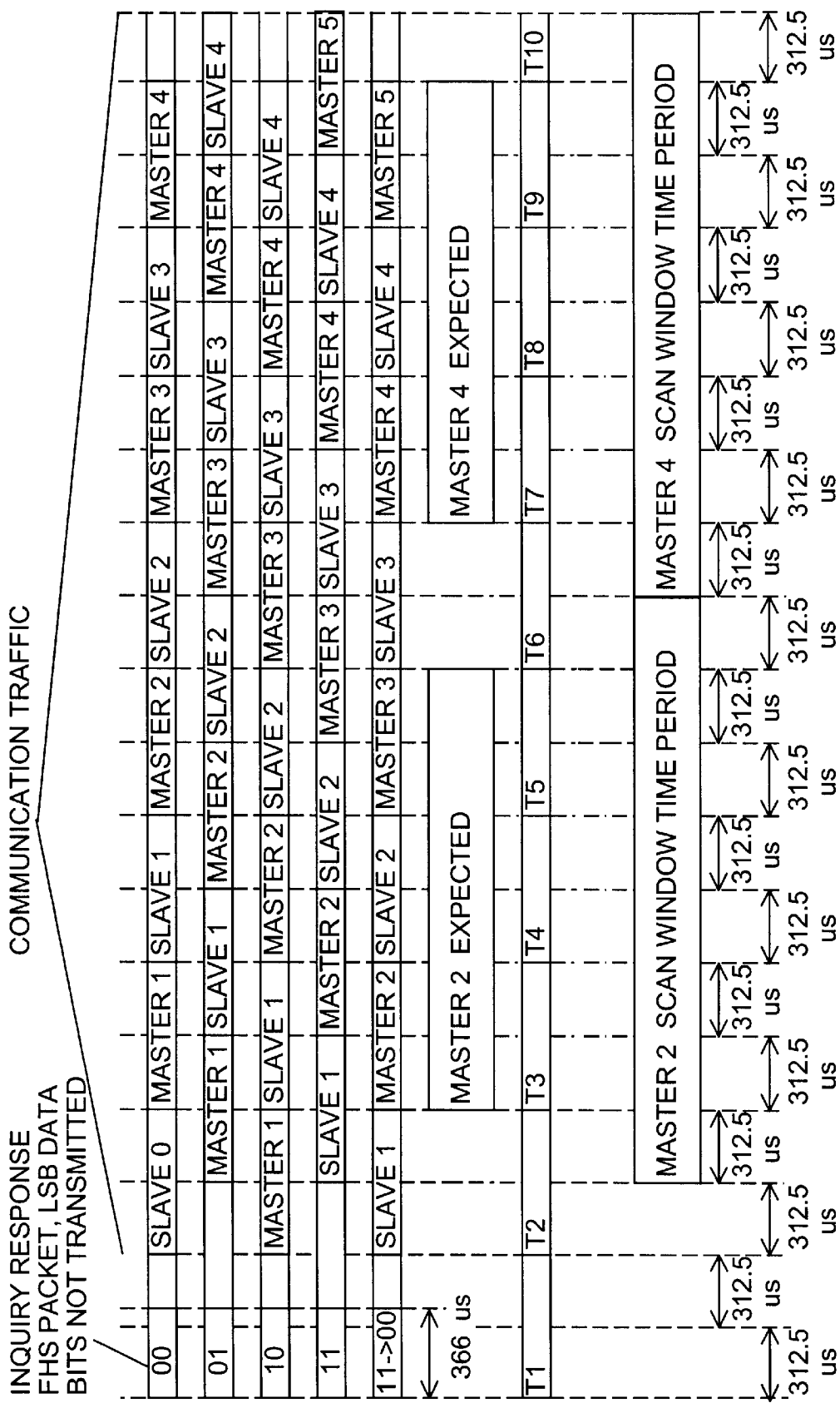
FIG. 5 is a time chart showing scan window time periods for a connected inquiry response synchronization method of FIG. 4.
Figure 6:
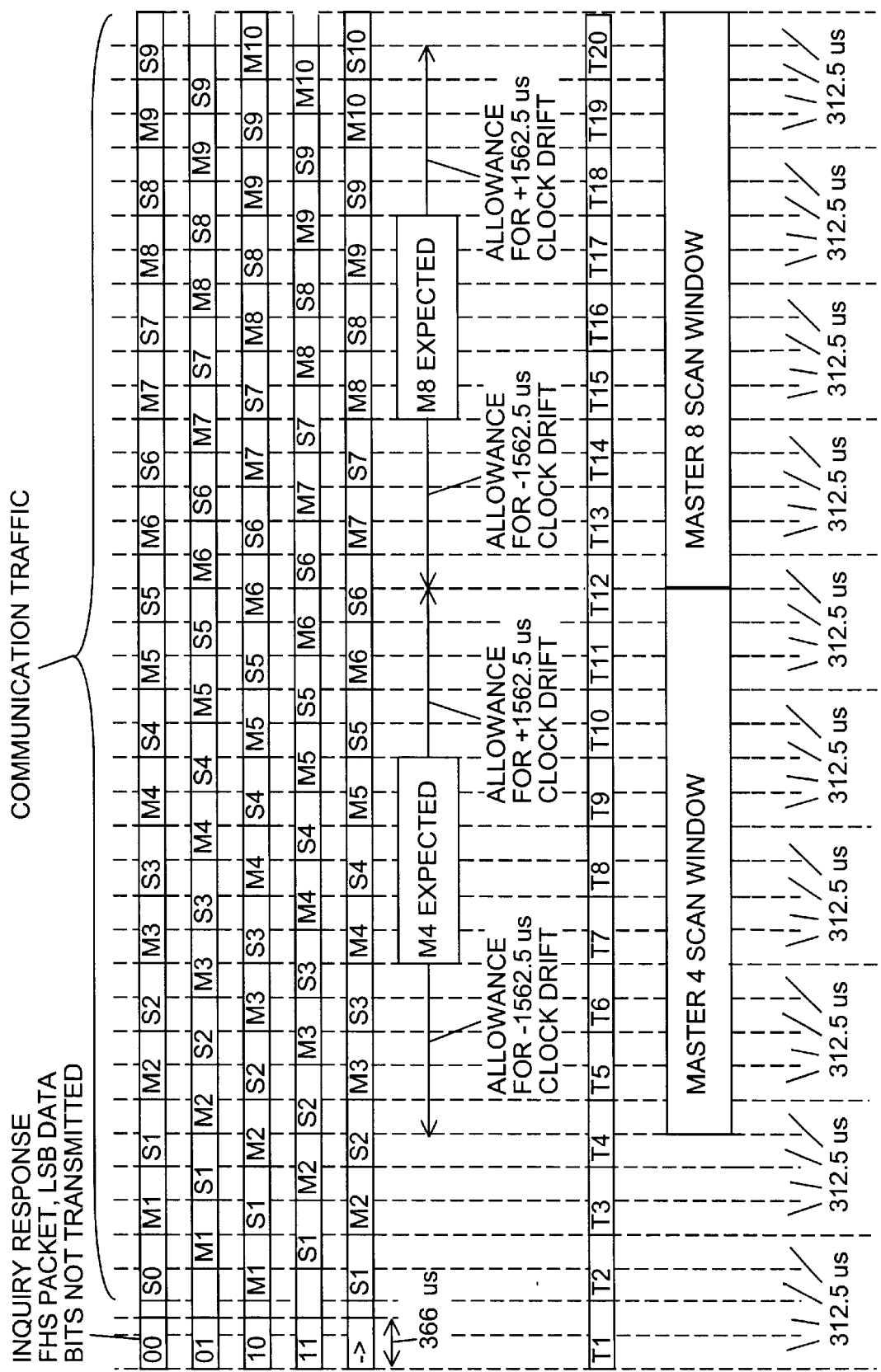
FIG. 6 is a time chart showing scan window time periods for an unconnected inquiry response synchronization method of FIG. 4.

In a step 164 the analyzer 30 tunes to its current channel in the channel hopping sequence for a scan window time period as illustrated in FIGS. 5 and 6 and described in the accompanying detailed descriptions. The scan window time period is the time period of a time slot multiplied by a selected time slot scan number. For a connected inquiry response synchronization for a BLUETOOTH implementation, a preferred time slot scan number is four. The time slot scan number is the number of time slots allocated for transmissions by the master device 17 and the slave devices 21–27. For a selected time slot scan number of four, the scan window time period is the length of time for two master communication traffic transmissions and two slave communication traffic transmissions. In the case of an unconnected inquiry response, a preferred time slot scan number depends upon and increases with the potential clock time drift between the system clock time in the master device 17 and a local clock time in the analyzer 30.

The analyzer 30 listens for communication traffic from the master device 17 in a step 166. In a step 167, when the scan window time period elapses before the analyzer 30 recognizes an instance of communication traffic, the analyzer 30 advances the channel of the channel hopping sequence by a subsequent channel advance number and returns to the step 164 for tuning on the new advance channel for the scan window time period. As illustrated in the FIGS. 5 and 6 and described in the accompanying detailed descriptions, a preferred subsequent channel advance number is four for a connected inquiry response and depends upon and increases with an allowance for the clock time drift between the analyzer 30 and the master device 17 for an unconnected inquiry response. However, a limitation of larger channel advance numbers is that there is a proportionally larger chance that communication traffic will be missed because fewer master channels are observed. Preferably, the time slot scan number and the initial and subsequent advance numbers are the same number. It should be noted that the user may take some time for instructing the master device 17 in the step 163 and it may be many iterations of the steps 166 and 167 before the master device 17 and one of the slave devices 21–27 are connected and exchanging communication traffic packets.

When a communication traffic packet from the master device 17 is recognized, in a step 168 the analyzer 30 uses the time-of-arrival of the packet for refining the system clock time for synchronizing to that and subsequent two-way communication traffic between the master device 17 and the slave devices 21–27 on the network 20. Then, in a step 172 the analyzer 30 sequentially tunes to the channels in the channel hopping sequence for receiving and observing the communication traffic packets.

FIGS. 5 and 6 are time charts showing a range of possible timings of the full 28 bits of master's exact BLUETOOTH system clock time with respect to the timing information that is available to the analyzer 30 from the inquiry response FHS packet that is received by the analyzer 30. The FHS packet is 366 microseconds long. The boxes 00, 01, 10, and 11 represent the possible values of the two least significant bits (LSB)s of the system clock time for the FHS packet. The box 00→11 represents an additional uncertainty for the system clock time because the time-of-arrival of the FHS packet in response to an inquiry depends upon the time-of-transmission of the inquiry by the analyzer 30 and is not synchronized to the system clock time. The communication traffic boxes associated in rows with the FHS packet boxes show times in 312.5 microsecond increments of the possible channels for the communication traffic between the master device 17 and slave devices 21–27 for each of the possible clock time uncertainties for the FHS packets.

In FIG. 5, Slave 0 (S0 in FIG. 6) represents the slave time slot or channel in the channel hopping sequence immediately following the master FHS packet. Master 1 (M1 in FIG. 6) represents the first master time slot or channel in the channel hopping sequence that the master device 17 can transmit after transmitting the FHS packet. Slave 1 (S1 in FIG. 6) represents the slave time slot or channel in the channel hopping sequence in which the one of the slave devices 21–27 addressed by the master device 17 in the master 1 (M1 in FIG. 6) time slot can respond to the master 1 (M1 in FIG. 6) transmission. Master 2 (M2 in FIG. 6) represents the second master time slot or channel in the channel hopping sequence that the master device 17 can transmit after transmitting the FHS packet. Slave 2 (S2 in FIG. 6) represents the slave time slot or channel in the channel hopping sequence in which the one of the slave devices 21–27 addressed by the master device 17 in the master 2 (M2 in FIG. 6) time slot can respond to the master 2 (M2 in FIG. 6) transmission, and so on. Due to the range of possible times for the system clock time, the analyzer 30 cannot assume that it can receive master communication traffic before the master 2 (M2 in FIG. 6) transmission.

Referring to FIG. 5, the boxes for T1–10 represent the time periods of the first ten sequential full time slots (625 microseconds) after the time-of-arrival of the start of the FHS packet. For a connected inquiry response FHS packet where the clock time drift is expected to be small, the analyzer 30 can expect to hear any master communication traffic on the master 2 channel sometime after the time slot T2 but before the time slot T6 (between 1250 and 3125 microseconds) after the time-of-arrival of the FHS packet. Of course, the master device 17 may elect to not transmit on the master 2 channel. In a preferred embodiment, the analyzer 30 tunes to the master 2 channel beginning at one and one-half time slots (937.5 microseconds) after the time-of-arrival of the inquiry response FHS packet for four total time slots (2500 microseconds) or two master time slots, then tunes to the master 4 for four total time slots or two master time slots, then tunes to the master 6 channel for four total time slots or two master time slots, and so on.

Neglecting clock time drift, a total time uncertainty of plus or minus a time slot (a total of two time slots) results from the two LSB bits of the system clock time and the relative phases of the local and system clock times. A scan window time period of three time slots captures the transmission time and the uncertainty in the alternative scenarios master 2 communication traffic. Thus, a time slot scan number of three would be sufficient. However, the time slot scan number of four is preferable so that there are no gaps in time. The time slot scan number of four also allows for ±312.5 microseconds of clock time drift. A time slot scan number of two may be used where the total time uncertainty is plus or minus one-half time slot (total of one time slot), for example in a system where all but one LSB of a system clock time was available to the analyzer 30.

Referring to FIG. 6, the boxes for T1–20 represent the time periods of the first twenty sequential full time slots (625 microseconds) after the time-of-arrival of the start of the FHS packet. For an unconnected inquiry response FHS packet a significant clock time drift error may be expected to occur between the master device 17 and the analyzer 30 during the time period between the time that the analyzer 30 receives the FHS packet and the time that the analyzer 30 receives an instance of communication traffic from the master device 17. During this time period the master device 17 reconnects to at least one of the slave devices 21–27 and then begins transmitting communication traffic packets when it has data that must be sent to one of the connected slave devices 21–27.

In an exemplary case for an allowance of ±1562.5 microseconds, the analyzer 30 can expect to hear any master communication traffic on the master M4 channel sometime after the middle of the fourth time slot T4 but before the middle of the twelfth time slot T12 (between 2187.5 and 7187.5 microseconds) after the time-of-arrival of the FHS packet if the master device 17 elects to transmit during the master M4 channel. In a preferred embodiment, for the case of an allowance of ±1562.5 microseconds, the analyzer 30 tunes to the master M4 channel beginning at three and one-half time slots after the time-of-arrival of the inquiry response FHS packet for eight total time slots (5000 microseconds) or four master time slots, then tunes to the master M8 channel eight total time slots or four master time slots, then tunes to the master M12 channel for eight total time slots or four master time slots, and so on.

FIG. 7 is a table of a preferred embodiment relating the allowance for clock time drift in microseconds to the channel advance number, the sequence of master advance channels, the time slot scan number, and the scan window time period in time slots. The sequence of master channels has incremental steps of one-half the channel advance number. For example, if a clock time drift allowance of 9062.5 microseconds is required, then preferred channel advance numbers of 32 and a preferred time slot scan number of 32 are selected. The sequence of master channels is M16, M32, M48, M64, and so on in increments of 16 counting from the FHS packet considered to be master channel 0. The scan window time period is 32 time slots, including 16 master time slots and 16 slave time slots. The channel advance number and the time slot scan number are preferably the same and a number that is two to an integer power. Other numbers can be used. However, the use of the same numbers at two to an integer power is preferable because it ensures that no time gaps occur between scan window time periods.

The table of FIG. 7 can be extended indefinitely for a greater clock time drift allowance requirement by dividing the required allowance by the time period of the time slot (625 microseconds) for a first result, adding one and one-half to the first result for a second result, multiplying the second result by two for a third result, and then rounding the third result upward to the next number that is two to an integer power. For example, for a required of allowance of 9062.5 microseconds, dividing 9062.5 by 625 yields 14.5. Adding 1½ yields 16. Multiplying by two yields 32. Because 32 is two to an integer power ($2^5$), the time slot scan number should be 32.

Similarly, for a required allowance of one-tenth second the calculation of 2*(100,000/625+1.5) yields 323. The number 323 is rounded up to the next higher number that is two to an integer power which is 512 ($2^9$) Therefore, for an allowance for clock time drift of one-tenth second, the channel advance number and the time slot scan number are five-hundred twelve. Preferably, the start of the first scan window with respect to the start of the FHS packet is one-half the channel advance number minus one-half, and the finish time slot after the FHS signal of the first scan window time period is the scan window time period later. For example, for channel advance and time slot scan numbers of 32, a preferred start point of the first scan window time period is at 15½ time slots (middle of the sixteenth time slot) and a preferred finish point of the first scan window time period is 47½ time slots (middle of the forty-eighth time slot) after the time-of-arrival of the start of the FHS packet.

Figure 8:
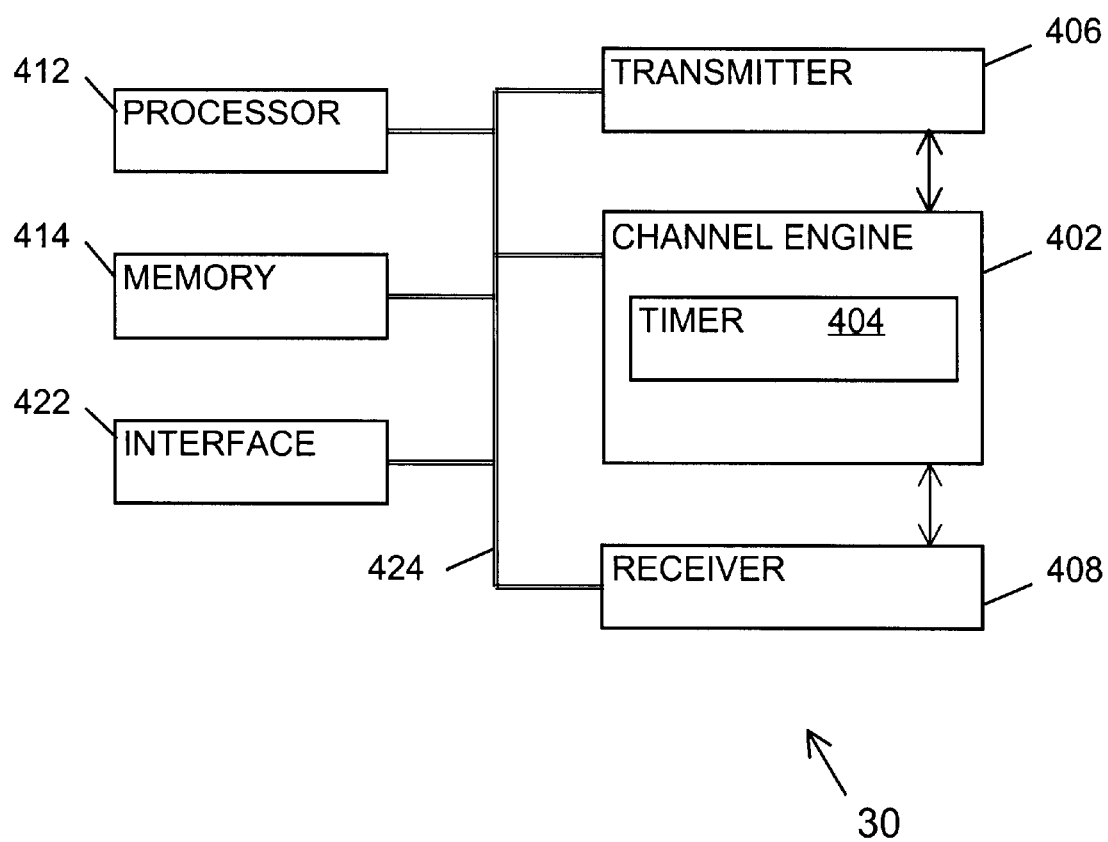
FIG. 8 is a block diagram of an analyzer of FIG. 3 for implementing the inquiry response synchronization method of FIG. 4.

FIG. 8 is a block diagram of the analyzer of the present invention referred to by the reference number 30. The analyzer 30 includes a channel engine 402 including a hop sequence generator and a timer 404; a transmitter 406; and a receiver 408. The timer 404 includes an oscillator, preferably using a crystal as a resonant element, as a time base for providing a local clock time. In an unsynchronized condition the local clock time has a clock rate that is nominally the same as the clock rate of the system clock time. The channel engine 402 provides information to the timer 404 for setting the local clock time according to the coarse system clock time data bits and the times-of-arrival of various signal packets including the inquiry response FHS and communication traffic packets from the master device 17. Then, once the system clock time has been acquired from the time-of-arrival of an instance of communication traffic from the master device 17, the timer 404 continues to use information for the times-of-arrival of the communication traffic packets for providing a local clock time that tracks the system clock time. The channel engine 402 uses the local clock time provided by the timer 404; operational mode; and address identifications for deriving and providing the channels for the channel hopping sequences as described above. The transmitter 406 transmits inquiry signals according to the channels and timing from the channel engine 402. The receiver 408 uses the channels and timing from the channel engine 402 for receiving inquiry FHS response and communication traffic signals.

The analyzer 30 also includes a processor 412, a memory 414, an interface 422, and a signal bus 424. The processor 412 operates in a conventional manner over the signal bus 424 for using program codes in the memory 414 for coordinating the activities of the above described elements of the analyzer 30. The interface 422 connects the analyzer 30 to external equipment for automatic operation of the analyzer 30 and passing data for the packets, measurements, and analysis to the external equipment. A user entry device in the external equipment enables a human user to set the mode in the analyzer 30 and to setup measurements and analysis on the communication traffic packets. A display in the external equipment enables a human user to view the status of the analyzer 30 and observe the communication traffic packets and results of the measurements and analysis. In a preferred embodiment, the channel engine 402 is implemented in a hardware state machine. However, those of ordinary skill in the fields of software and hardware development will recognize that there are several ways in which the channel engine 402 can be implemented including a state machine in software and a multi-tasking software system.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method of synchronizing to a communication network without joining said network, said network including a master device transmitting and receiving communication traffic signals on channels during time slots in a channel hopping sequence, comprising steps of:

receiving a preliminary signal having coarse time information having less than full resolution for a system clock time from said master device, said preliminary signal having a time-of-transmission not synchronized to said system clock time;

using said coarse time information for deriving an initial one of said channels; and sequentially tuning to certain ones of said channels beginning at said initial channel and then to new ones of said certain channels, said new certain channels computed by advancing in said sequence from last ones of said certain channels by a selected channel advance number of at least four, until at least one instance of said communication traffic signals is received.

2. The method of claim 1, further comprising a step of:

using a time-of-arrival of said instance of said communication traffic signals for refining said coarse time information for determining said system clock time; and using said system clock time for synchronizing to said channels in said sequence for receiving subsequent instances of said communication traffic signals.

3. The method of claim 1, wherein:

the step of sequentially tuning includes tuning to each of said new certain channels for a scan window time period of a selected time slot scan number of at least four time periods of said time slots.

4. The method of claim 3, further comprising a step of:

selecting said time slot scan number based upon a clock time drift allowance for clock time drift of a local clock time with respect to said system clock time occurring between receipt of said preliminary signal and receipt of said instance of said communication traffic signals.

5. The method of claim 4, wherein:

said time slot scan number is at least two times a sum of 1½ and a dividend of said clock time drift allowance divided by the time period of said time slot.

6. The method of claim 5, wherein:

said time slot scan number is two to an integer power.

7. The method of claim 3, wherein:

said subsequent channel advance number and said time slot scan number are the same number.

8. The method of claim 1, wherein:

the step of deriving said initial channel includes a step of advancing said sequence from a one of said channels corresponding to said coarse time information by an initial channel advance number of at least four.

9. The method of claim 1, wherein:

said coarse time information is twenty-six out of twenty-eight data bits for said system clock time.

10. The method of claim 1, wherein:

said master device operates according to a BLUETOOTH specification; and said communication network further includes at least one slave device operating according to said BLUETOOTH specification.

11. The method of claim 10, further comprising a step of:

transmitting an inquiry for determining identifications of said master and slave devices within signal range operating according to said BLUETOOTH specification; and wherein:

the step of receiving said preliminary signal includes receiving said preliminary signal in response to said inquiry.

12. The method of claim 1, wherein:

said resolution of said system clock time is defined in bits.

13. An apparatus for synchronizing to a communication network without joining said network, said network including a master device transmitting and receiving communication traffic signals on channels during time slots in a channel hopping sequence, comprising:

a receiver for receiving a preliminary signal having coarse time information having less than full resolution for a system clock time from said master device, said preliminary signal having a time-of-transmission not synchronized to said system clock time; and then sequentially tuning to certain ones of said channels until at least one instance of said communication traffic signals is received;

a timer for using said coarse time information for issuing an estimated said system clock time; and a channel engine for deriving an initial one of said certain channels from said estimated system clock time, and then computing new ones of said certain channels by advancing in said sequence from last ones of said certain channels by a selected channel advance number of at least four.

14. The apparatus claim 13, wherein:

the timer uses a time-of-arrival of said instance of said communication traffic signals for refining said estimated clock time for determining said system clock time;

the channel engine derives said channels in said sequence according to said system clock time; and the receiver tunes to said channels for receiving subsequent instances of said communication traffic signals.

15. The apparatus of claim 13, wherein:

the channel engine provides said certain channels for a scan window time period of a selected time slot scan number of at least four time periods of said time slots before hopping to said new ones of said certain channels.

16. The apparatus of claim 15, wherein:

said time slot scan number is selected based upon a clock time drift allowance for clock time drift of a local clock time with respect to said system clock time occurring between receipt of said preliminary signal and receipt of said instance of said communication traffic signals.

17. The apparatus of claim 16, wherein:

said time slot scan number is at least two times a sum of 1½ and a dividend of said clock time drift allowance divided by the time period of said time slot.

18. The apparatus of claim 17, wherein:

said time slot scan number is two to an integer power.

19. The apparatus of claim 15, wherein:

said subsequent channel advance number and said time slot scan number are the same number.

20. The apparatus of claim 13, wherein:

the channel engine derives said initial channel by advancing said sequence from a one of said channels corresponding to said estimated system clock time by an initial channel advance number of at least four.

21. The apparatus of claim 13, wherein:

said coarse time information is twenty-six out of twenty-eight data bits for said system clock time.

22. The apparatus of claim 13, wherein:

said master device operates according to a BLUETOOTH specification; and said communication network further includes at least one slave device operating according to said BLUETOOTH specification.

23. The apparatus of claim 22, further comprising:

a transmitter for transmitting an inquiry for determining whether said master device is within signal range; and wherein:

said preliminary signal is received in response to said inquiry.

24. The apparatus of claim 13, wherein:

said resolution of said system clock time is defined in bits.

* * * * *